March 19, 1968  D. A. VOORHIES  3,374,039
ANTIFRICTION BEARING
Filed Sept. 1, 1965  2 Sheets-Sheet 1
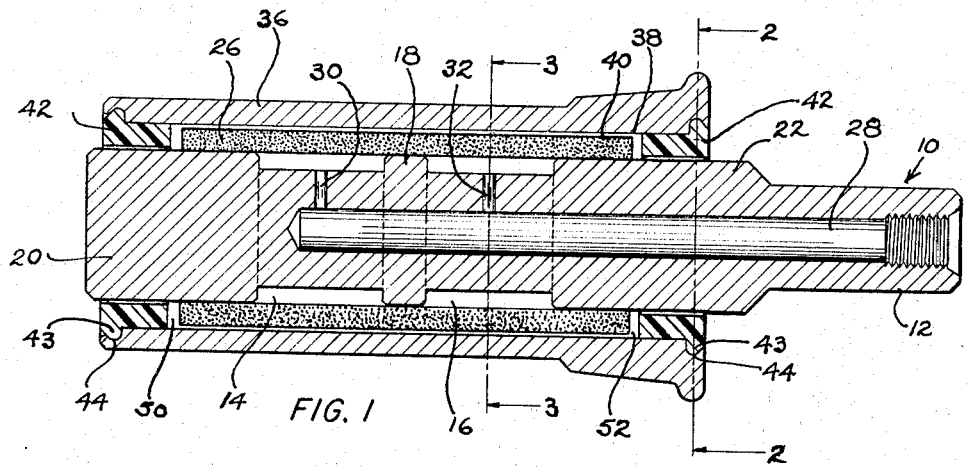
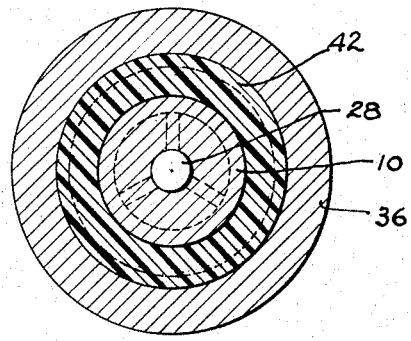
FIG. 2
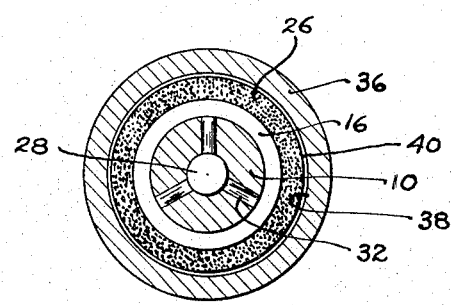
FIG. 3
INVENTOR
DONALD A. VOORHIES
By Edward H. Goodrich
HIS ATTORNEY March 19, 1968 D. A. VOORHIES 3,374,039
ANTIFRICTION BEARING
Filed Sept. 1, 1965 2 Sheets-Sheet 2

INVENTOR
DONALD A. VOORHIES
BY Edward H. Goodrich
HIS ATTORNEY

United States Patent Office 3,374,039
Patented Mar. 19, 1968

3,374,039
ANTIFRICTION BEARING
Donald A. Voorhies, West Hartford, Conn., assignor to General Motors Corporation, Detroit, Mich., a corporation of Delaware
Filed Sept. 1, 1965, Ser. No. 484,315
9 Claims. (Cl. 308—107)

ABSTRACT OF THE DISCLOSURE

An air bearing of the externally pressurized type in which the stationary support includes a hub and a chamber which opens onto the inside of a porous sleeve portion so that the pressurized air fed to the chamber permeates through it into a controlled clearance between the sleeve and a rotatable shell which surrounds it. The shell includes end bushings spaced from the end faces of the porous member so that the air supports the shell and centers it on the hub. In one embodiment, the end bushings are spaced from the hub outboard of the porous sleeve with the space between the hub and the end bushings providing a restricted leakage path for the air. In a modification, one end of the shell is completely sealed and a valving arrangement is provided at the other end to center the shell on the hub.

---

Figures 4, 5, 6:
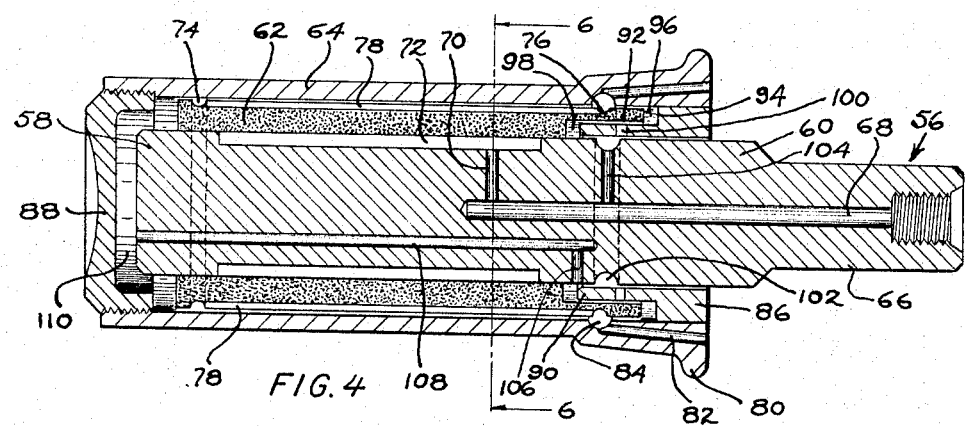

This invention relates to journal bearings and particularly to an improved bearing construction wherein a sleeve or other rotatable member is supported for free rotation by a fluid flow through the journal under pressure. In the preferred form of this invention, a fluid which may be a liquid or gas flows under evenly distributed pressure throughout the major portion of the closely confined annular space between the rotating member and a hub and uniformly supports the rotatable member out of contact with the hub even under conditions of high temperature operation.

Heretofore, journal bearings have been provided wherein lubricant, as oil under pressure, is fed against a rotatable shaft at circumferentially and axially spaced locations from pockets in a journal. Bearings of this type are expensive to manufacture and must be limited to very light radial loads since the position and area of the spaced pockets appreciably restricts the area of the shaft which is supported by the lubricant. Furthermore, with this type of bearing construction, the lubricant must usually be fed to these spaced areas on the shaft under very high pressure. If the load carried by the shaft is nonuniform or suddenly undergoes a change, these spaced lubricant supports frequently let the shaft shift into detrimental metal-to-metal rubbing contact with the journal thus severely damaging the bearing and causing ultimate and often sudden bearing failure. In view of manufacturing difficulties, the number and position of these spaced pockets is usually so limited that the shaft cannot be uniformly supported within its journal.

It is, therefore, an object of my invention to provide an improved bearing wherein a sleeve or other member is supported for substantially friction-free rotation by an annular body of fluid flowing under pressure between the rotatable member and its journal.

A further object of this invention is to provide an improved anti-friction bearing wherein a member is supported for free rotation about a hub by a uniformly surrounding body of gas under pressure.

A still further object of this invention is to provide an antifriction bearing of simple construction and wherein an elongated sleeve member is evenly supported throughout its length and axially positioned by a uniformly distributed annular body of flowing fluid under relatively low pressure.

To these ends and also to improve generally upon devices of this character, the invention consists in the various matters hereinafter described and claimed. In its broader aspects, the invention is not necessarily limited to the specific embodiments shown by way of illustration wherein:

FIGURE 1 is a diagrammatical cross section view through one form of my invention;
FIGURE 2 is a cross section taken along the lines 2—2 of FIGURE 1;
FIGURE 3 is a cross section taken along the lines 3—3 of FIGURE 1;
FIGURE 4 is a cross section view through another embodiment of the invention;
FIGURE 5 is a right hand end view of the structure of FIGURE 4; and
FIGURE 6 is a cross section taken along the lines 6—6 of FIGURE 4.

Generally considered, my invention is illustrated in the form of an antifriction idler roll wherein a roll shell is radially supported and axially positioned for substantially friction-free rotation by a flowing fluid which is uniformly distributed under pressure against a cylindrical wall of the roll shell through the evenly distributed interconnected pore structure of a porous supporting sleeve coaxial with this shell.

As illustrated, in the embodiment of FIGURES 1, 2 and 3, there is provided a nonrotatable hub 10 having an end portion, herein shown as a reduced portion 12, arranged to be held within a suitable support (not shown). This hub which is preferably cylindrical has a pair of axially spaced annularly extending external recesses or grooves 14 and 16 respectively located at each side of an intermediate and enlarged cylindrical portion 18. The groove 14 axially extends to an enlarged cylindrical hub portion 20 on the left end of the hub and the groove 16 axially extends toward the right to a similar enlarged cylindrical hub portion 22. These enlarged cylindrical hub portions 18, 20 and 22 are coaxial and preferably of the same diameter. A porous sleeve member 26 is tightly fitted over and in sealing engagement with the enlarged hub portions 18, 20 and 22 thus making the recesses 14 and 16 in the form of annular chambers between the hub and the sleeve. The right end of this sleeve member terminates intermediate the length of the cylindrical hub portion 22 and the left hand end of this sleeve member 26 similarly terminates intermediate the length of the hub portion 20. The porous sleeve member 26 may be made from a sintered material having a substantially uniform intercommunicating pore structure throughout its entire body—this intercommunicating pore structure being of a size to uniformly disperse the flow of fluid under pressure therethrough. These intercommunicating pores are preferably very small and uniform in size and open through the outer walls of the sleeve in very closely spaced relation to each other. Suitable sleeve members for this purpose have been constructed from sintered iron, bronze, ceramic materials, and from various plastics and other materials which are molded with a predetermined interconnected small pore structure.

An axial bore 28 extends into the hub from one end thereof and communicates through generally radial passages 30 and 32 with the chambers 14 and 16 between the sleeve 26 and the hub 10. With this arrangement, fluid under pressure is distributed uniformly against the major portion of the entire area of the interior of the porous sleeve member 26. A rotatable roll shell 36 of metal or other suitable impervious material is provided with a cylindrical bore 38 which is in close tolerance surrounding relation about the cylindrical external surface 40 of the porous sleeve member 26. The interior of this roll shell 36 and the exterior of the porous sleeve 26 are preferably precisely finished as by grinding and/or honing and this close tolerance relation between these diameters may be as small as a fraction of a thousandth of an inch.

The radial space beyond the ends of the sleeve 26 and between each end of the roll shell 36 and the respective cylindrical hub portions 20 and 22 therein, is substantially closed by a bushing 42 fitted within the cylindrical bore at each end of the roll shell. Each bushing 42 may have an annularly extending deformable flange 43 that is matingly seated within a corresponding annular groove 44 in the end of the roll shell 36. Preferably, each annular flange 43 is transversely rounded to facilitate snap-fit insertion and removable of the bushing from the roll shell and to seal against fluid leakage between the roll shell and the bushing 42. This interfitted relation of these bushings assures that the bushings will remain in proper axial and radial positions and will not end to shift out of the roll shell.

Each bushing 42 has a bore which slightly exceeds the diameter of a respective hub portion 20 or 22 received therein so that during idler roll operation while the rotatable roll shell 36 is fluid-pressure supported, these bushings will be out of contact with the hub 10. These bushings 42 may be made of a suitable yieldable plastic material having a low coefficient of friction with respect to the hub in the event that these bushings may engage the hub portions 20 and 22. Examples of various materials which I have found satisfactory for these bushings may comprise a synthetic polymeric amide, usually referred to as "nylon," and a polymeric tetrafluoroethylene commonly known as "Teflon." These demountable snap-in bushings 42 provide for a unit-handling idler roll assembly structure and also facilitate removal of the roll shell when it is desired to clean the sleeve member 26. As shown in FIGURE 1, the annular inner end of each bushing 42 terminates in an end face herein illustrated as a radial face which is preferably in axially spaced relation to a similar annular end face on the porous sleeve 26.

Fluid which may comprise various light bodied liquids or a gas, such as air, is directed under pressure into the bore 28 of the hub and out through the passages 30 and 32 into the annular chambers 14 and 16. The closely spaced small interconnected pore structure which exists throughout the sleeve member 26, evenly distributes this fluid under reduced pressure into the small annular space between the outer cryindrical surface of the sleeve member 26 and the inner cylindrical surface of the roll shell 36 thus uniformly supporting the roll shell for substantially friction-free rotation upon a thin evenly-distributed annular body of flowing fluid over a cylindrical area which extends throughout the major portion of the length of the roll shell. In view of the uniform distribution of this supporting fluid throughout the length of the porous sleeve member 26, it has been found that a low fluid pressure suffices to support the roll shell for free rotation even when this roll shell is subjected to an appreciable radial load.

The fluid under pressure flows between the porous sleeve 26 and the roll shell 36 into annular pockets 50 and 52 between the ends of the sleeve member 26 and the respective bushings 42 and thence exhausts out through the annular spaces between these bushings and the cylindrical hub portions 20 and 22. This fluid pressure in the pockets 50 and 52 axially positions the roll shell with respect to the sleeve 26. The axial bore in each bushing 42 is predetermined so that the fluid pressure which supports the roll shell 36 under its required radial load will maintain the roll shell out of contact with the porous sleeve 26 and at the same time will maintain the bushings 42 in spaced relation to the porous sleeve to axially position the roll shell. Also, the flow of fluid exhausting through the annular spaces between the bushings 42 and the hub portions 20 and 22 will provide additional radial support for the roll shell 36. If the supporting and positioning fluid for the roll shell comprises a gas, as exemplified by air, my invention will satisfactorily operate at very high temperatures which greatly exceed the permissible operating temperatures of liquid lubricants.

In the embodiment of FIGURES 4, 5 and 6, a nonrotatable hub 56 has axially spaced cylindrical portions 58 and 60 over which is tightly fitted a porous sleeve 62 surrounded by a rotatable roll shell 64 in generally the same manner as described with respect to the construction of FIGURE 1. The hub 56 has a reduced end portion 66 arranged to be mounted on a suitable support (not shown). A supporting fluid, as a light bodied liquid or a gas which may be air, is fed under pressure into an axially extending hub bore 68 and thence out through a communicating duct 70 into an external annular hub groove 72 located between the enlarged cylindrical hub portions 58 and 60—this groove being surrounded by and radially opening onto the porous sleeve 62. The rotatable roll shell 64 which closely surrounds the porous sleeve 62, has a cylindrical bore whose diameter slightly exceeds that of the cylindrical outer periphery of the porous sleeve. The radial clearance between the roll shell and the external cylindrical surface of the porous sleeve may be as slight as a small fraction of one thousandth of an inch. Fluid is fed under pressure through the bore 68, duct 70, and into the annular groove 72 from which it uniformly disperses through the small closely-spaced intercommunicating pores in the porous sleeve 62 to evenly support the roll shell 64 under fluid pressure through the major portion of its length for substantially friction-free rotation in generally the same manner as previously described with reference to the construction of FIGURE 1. Due to the small pore structure of the sleeve 62 and the close clearance between the roll shell and the sleeve, a relatively low fluid pressure will usually suffice to support a heavy radial load on the roll shell.

The porous sleeve 62 which may be composed of a sintered material, a porous ceramic material, or even a molded material having a uniformly dispersed intercommunicating pore structure, is provided near each of its respective ends with annularly extending peripheral grooves 74 and 76 radially opening onto the interior of the rotatable roll shell 64. These annular grooves are interconnected by a plurality of circumferentially spaced longitudinally extending grooves 78 which also may open onto the interior of the roll shell 64. One end of the roll shell, herein illustrated as the right hand end, has a flanged portion 80 provided with a series of circumferentially spaced passages 82 which open out of the roll shell at their outer ends and which at their inner ends connect with an annular roll shell groove 84 opening radially inwardly in surrounding relation onto the annular groove 76. The width of the groove 84 exceeds the width of the groove 76 sufficiently to provide intercommunication between each of these grooves under normal endwise shifting of the roll shell 64 with respect to the hub 56. During operation of the fluid pressure supported roll shell, the uniformly distributed fluid which flows under pressure between the porous sleeve and the roll shell, and which supports the roll shell for free rotation out of contact with the hub and porous sleeve, exhausts from the grooves 74, 76, 78 and 84 out through the passages 82.

The annular space between the flanged portion 80 and the enlarged hub portion 60 is substantially closed by a stepped sleeve 86 tightly fitted in the end of the roll shell and having a through axial bore which has a diameter that slightly exceeds that of the hub portion 60 therein. The opposite end of the roll shell 64 is closed by an end cap 88 demountably threaded in position in overlying spaced relation to an end of the enlarged hub portion 58 and in axially spaced relation to the adjacent end of the porous sleeve 62. The inner end of the stepped sleeve 86 is reduced to provide a cylindrical sleeve portion 90 that axially extends in closely radially spaced relation within a counterbore 92 in the end of the porous sleeve 62. The outer end of the reduced sleeve portion 90 terminates intermediate the bushing ends in a generally radial annular wall 94 which is normally in axially spaced relation to the adjacent annular end of the porous sleeve 62 thus providing an annular fluid-receiving pocket 96 between the porous sleeve and the intermediate portion of the bushing 86. Similarly, the annular inner end wall of the reduced sleeve portion 90 normally locates in axially spaced relation to the bottom of the counterbore 92 thus providing an annular fluid-receiving pocket 98 between the end of the stepped bushing and the bottom of this counterbore.

A plurality of circumferentially spaced generally radial passages 100 through the reduced sleeve portion 90 communicate at their radial outer ends through the counterbore 92 with both fluid-receiving pockets 96 and 98. Also, fluid under pressure enters the pocket 98 from the annular space between the bushing 86 and the enlarged hub portion 60. The open inner ends of these passages 100 overlie in valved relation the right hand side of an annular groove 102 in the hub portion 60. This groove 102 is supplied with fluid under pressure from a duct 104 that communicates with the passages 68. The inner end of the reduced sleeve portion 90 overlies in valved relation the right side of a duct 106 that communicates through a longitudinal hub passage 108 with a pocket 110 formed between the end cap 88, enlarged hub portion 58, and the left end of the porous sleeve 62. Hence, fluid flowing under pressure through the passage 68 in addition to providing a uniform antifrictional support for the rotatable roll shell 64, feeds through the duct 104, passages 100 into the pockets 96 and 98 and through the passages 106 and 108 into the pocket 110 at the left hand of the roll shell.

Fluid pressure in the pocket 110 tends to axially shift the roll shell 64 towards the left and fluid pressure in the pockets 96 and 98 tends to axially shift the roll shell towards the right. Since the passages 100 are located in valving relation at the right side of the fluid-pressure delivery groove 102, it will be appreciated that a shift of the roll shell 64 towards the right with respect to the hub 56 as viewed in FIGURE 4, will reduce and finally cut off the feed of fluid under pressure to the annular pocket 96 while at the same time this shift of the roll shell 64 towards the right will open the valving of the duct 106 thus increasing the pressure in the pocket 110. Similarly, if the pressure in the fluid pocket 110 exceeds the pressure in the fluid pockets 96 and 98, the roll shell 64 will automatically shift to the left until such time as the inner end of the reduced sleeve portion 90 partially closes the duct 106 while opening the valving of the passages 100 to increase the fluid pressure in the pockets 96 and 98. This adjustable axial shift in either direction continues until a state of equilibrium exists thus axially and automatically positioning the roll shell 64. Due to the clearance of the periphery of the porous sleeve 62 with respect to the bore of the roll shell, some of the fluid under pressure in both pockets 110 and 96 will blead out between the porous sleeve and the roll shell thus providing for fluid exhaust from the pockets 96 and 110. Also, some of the fluid under pressure flowing from the annular groove 102 will flow between the stepped sleeve 86 and the hub portion 60 thus providing an additional radial bearing support for the roll shell.

I claim:

1. An antifriction bearing comprising a hub, a porous sleeve having end portions tightly fitted over the hub in nonrotatable relation thereto, said porous sleeve and hub providing a fluid-receiving chamber opening radially outwardly of the hub onto the interior of said sleeve, a rotatable roll shell closely surrounding the porous sleeve and axially extending outwardly beyond the ends of said sleeve, closure means respectively located between the ends of said roll shell and said hub, each closure means being in axially spaced relation to the adjacent end of the porous sleeve, one of said closure means being in radial spaced relationship to said hub and having an inner diameter less than the outer diameter of said sleeve, and said hub having a fluid-receiving passage communicating with said chamber whereby fluid delivered under pressure into said chamber will permeate under reduced pressure through the porous sleeve and provide a uniformly distributed fluid pressure support for the rotatable roll shell in spaced relation to the porous sleeve.

2. An antifriction bearing comprising a nonrotatable hub, said hub having axially spaced enlarged portions, a porous sleeve having end portions tightly fitted over the enlarged hub portions, said sleeve and hub cooperatively providing between said enlarged hub portions a gas-receiving chamber opening onto the interior of the porous sleeve, a rotatable roll shell closely surrounding the porous sleeve and axially extending outwardly beyond the ends of said sleeve, closure members respectively mounted in the ends of the roll shell in axially spaced relation to the adjacent ends of the porous sleeve and surrounding the enlarged hub portions in closely spaced relation thereto along a diameter less than the outer diameter of the porous sleeve, and said hub having a gas-receiving passage communicating with said chamber whereby gas delivered under pressure to said chamber will pass through the sleeve and provide a uniform antifriction roll shell support and axially position the roll shell with respect to the hub.

3. An antifriction bearing comprising a nonrotatable hub, axially spaced enlarged cylindrical hub portions providing a peripherally extending hub groove therebetween, a porous sleeve circumferentially enclosing said groove and having end portions tightly fitting over the enlarged cylindrical hub portions, a rotatable roll shell closely surrounding the porous sleeve and axially extending outwardly beyond each end of the porous sleeve in overlying relation with said enlarged hub portions, bushings respectively mounted in each end of the roll shell in closely surrounding spaced relation to the enlarged hub portions and in axially spaced relation to the ends of the porous sleeve, and said hub being provided with a passage communicating with the hub groove whereby fluid fed under pressure into said hub groove evenly flows through the porous sleeve to uniformly radially support the roll shell throughout the length of said sleeve and throughout the length of each of said bushings and simultaneously pockets between said bushings and the porous sleeve to axially position the roll shell with respect to the hub.

4. An antifriction bearing comprising a hub, a porous sleeve having end portions tightly fitted over axially spaced hub portions, the porous sleeve and hub cooperatively providing an annular fluid-receiving chamber opening onto the interior of said sleeve, a rotatable roll shell closely surrounding the porous sleeve and extending axially outwardly beyond the ends of said sleeve, closure members in the ends of the roll shell closely surrounding the respective axially spaced hub portions and providing a fluid-receiving pocket at each end of the roll shell, said hub having a passage for delivering fluid under pressure to said annular fluid chamber and having ducts for delivering fluid to said pockets, and valving means regulating the fluid pressure to said ducts in response to the axial position of the roll shell.

5. An antifriction bearing comprising a hub, a porous sleeve tightly fitted over said hub, the hub having an annular chamber opening onto an intermediate portion of the interior of said sleeve, a rotatable roll shell closely surrounding the porous sleeve and axially extending outwardly beyond each end of said sleeve, a closure member in each end of the roll shell, each closure member being axially spaced from an adjacent end of the porous sleeve, said closure members respectively providing a fluid pocket at each end of the porous sleeve, the hub having passages for respectively delivering fluid under pressure to said annular chamber and to each of the fluid pockets, and valving means provided by one of said closure members for regulating the delivery of fluid under pressure to said pockets in response to the axial position of the roll shell relative to the porous sleeve.

6. An antifriction bearing comprising a hub, a porous sleeve mounted on the hub, a roll shell surrounding the porous sleeve and arranged to be supported for both rotatable and axial movements by fluid fed under pressure into the annular space between the porous sleeve and the roll shell, said hub being provided with a passage and chamber to direct fluid under pressure to the interior of said sleeve, an end cap closing one end of the roll shell and providing a fluid pocket at said end of the roll shell, the porous sleeve having a counterbored end within the other end of the roll shell, a stepped bushing in said other end of the roll shell and closely surrounding the hub, a reduced inner end on said bushing extending into radial and axially spaced relation with the counterbored end of the roll shell and providing a fluid-receiving pocket between the bushing and sleeve end, said hub having passages to deliver fluid under pressure respectively to said pockets, each of said passages being provided with a duct opening onto and valved by the reduced bushing portion whereby an axial shifting of the roll shell and bushing regulates said valving to axially position the roll shell with respect to the hub.

7. An antifriction bearing comprising a hub, a porous sleeve mounted thereon, a roll shell surrounding the porous sleeve and overlying its ends, said roll shell being arranged to be supported by fluid under pressure about said sleeve for rotatable and axial movements, the hub having a passage for delivering fluid under pressure to the porous sleeve, an end cap closing one end of the roll shell and providing for a fluid pocket between the end cap and the adjacent end of the hub, a stepped bushing closing the other end of said roll shell and closely surrounding said hub, said porous sleeve having a counterbored portion adjacent to the bushing, an inwardly extending reduced portion on the bushing lying within the counterbore in axially and radially spaced relation to the porous sleeve, the stepped bushing providing with said sleeve an annular fluid pocket at the end of the sleeve, said hub having an annular groove opening onto the reduced portion of the porous sleeve, the reduced bushing portion having a port valved by one side of said groove and communicating with the last mentioned fluid pocket, the hub having a duct communicating with said hub groove, said hub having another fluid-receiving passage extending from the first mentioned pocket and communicating with a duct opening into the space in the bottom of said counterbore and valved by the reduced end portion of the bushing whereby an axial shifting of the roll shell simultaneously closes one duct and opens the other duct to regulate the pressures in said pockets for automatically axially positioning the roll shell.

8. An antifriction bearing comprising,
support means including,
porous sleeve means having an outer cylindrical surface and annular end faces and hub means extending axially beyond the ends of said porous sleeve means, said porous sleeve means and hub means providing a gas receiving chamber opening onto the interior of said sleeve, and a rotatable shell closely surrounding said porous sleeve means and extending axially beyond the ends of said porous sleeve means,
closure means located adjacent the respective ends of said shell, said closure means being in spaced relation to said end faces, respectively, and in spaced relation to said hub means along a diameter less than the outer diameter of said porous sleeve means,
and passage means in said hub means communicating with said chamber whereby gas delivered under pressure will permeate through said porous sleeve means and provide a fluid pressure support for said shell radially and axially in spaced relation to said porous sleeve means.

9. An antifriction bearing comprising,
support means including,
a porous sleeve means,
and impervious portions extending axially beyond the ends of the porous sleeve means, said impervious portions having an outer diameter less than the outer diameter of said porous sleeve means thereby providing exposed annular end faces on said porous sleeve means,
and a gas receiving chamber bounded by said porous sleeve means and said impervious portions,
a rotatable shell closely surrounding said porous sleeve means,
closure means located adjacent the respective ends of said shell, said closure means being axially spaced from said end faces and radially spaced from said impervious portions, and
passage means adapted to connect said chamber to a source of pressurized gas whereby gas delivered under pressure to said chamber will permeate said porous sleeve means and flow between said porous sleeve means and said shell and thence between said closure means and said porous sleeve means and thence out between said closure means and said impervious portions, said closure means and said impervious portions forming a restriction whereby sufficient pressure is maintained in the gas to support said roll shell on said porous sleeve means out of contact therewith and to center said roll shell on said support means.

References Cited
UNITED STATES PATENTS

| | | |
|---|---|---|
| 1,816,758 | 7/1931 | Adams. |
| 2,409,057 | 10/1946 | Meinke. |
| 2,696,410 | 12/1954 | Topanelian. |
| 2,778,066 | 1/1957 | Walmsley. |
| 2,855,249 | 10/1958 | Gerard. |

FOREIGN PATENTS

| | | |
|---|---|---|
| 585,188 | 1/1947 | Great Britain. |
| 606,541 | 8/1948 | Great Britain. |

MARTIN P. SCHWADRON, *Primary Examiner.*

FRANK SUSKO, *Examiner.*